US010455537B2

United States Patent
Kautz

(10) Patent No.: US 10,455,537 B2
(45) Date of Patent: Oct. 22, 2019

(54) METHOD FOR CALCULATING A POSITION OF A TRANSPONDER WITHIN AN AREA OF INTEREST

(71) Applicants: Swiss Timing Ltd, Corgemont (CH); Friedrich-Alexander-Universitaet Erlangen-Nuernberg, Erlangen (DE)

(72) Inventor: Thomas Kautz, Sangerhausen (DE)

(73) Assignees: Swiss Timing Ltd, Corgemont (CH); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 0 days.

(21) Appl. No.: 16/007,360

(22) Filed: Jun. 13, 2018

(65) Prior Publication Data

US 2018/0359720 A1    Dec. 13, 2018

(30) Foreign Application Priority Data

Jun. 13, 2017 (EP) .................................... 17175720

(51) Int. Cl.
*H04W 64/00* (2009.01)
*G01S 5/06* (2006.01)
(Continued)

(52) U.S. Cl.
CPC ......... *H04W 64/003* (2013.01); *G01S 5/0215* (2013.01); *G01S 5/0294* (2013.01);
(Continued)

(58) Field of Classification Search
CPC .. H04W 64/003; G01S 5/0215; G01S 5/0294; G01S 5/06; G01S 13/75; G01S 13/878
See application file for complete search history.

(56) References Cited

U.S. PATENT DOCUMENTS 4,679,046 A * 7/1987 Curtis ..................... G01S 7/026
340/572.7
6,141,558 A * 10/2000 Chen ........................ G01S 3/58
455/456.1
(Continued)

FOREIGN PATENT DOCUMENTS

DE    10 2009 053 872 A1    5/2011
EP         3 176 600 A1    6/2017

OTHER PUBLICATIONS

European Search Report dated Nov. 27, 2017 in European Application 17175720.6, filed on Jun. 13, 2017 (with Written Opinion).

*Primary Examiner* — Khai M Nguyen
(74) *Attorney, Agent, or Firm* — Oblon, McClelland, Maier & Neustadt, L.L.P.

(57) ABSTRACT

The invention relates to method for calculating a position of a transponder within an area of interest, by means of a local positioning system comprising a set of directive antennae located in the vicinity of the area of interest, each antenna having a coverage area, the method comprising the following steps:
  assessing an approximate position of the transponder
  selecting at least one antenna of the set of antennae that is such that the transponder is within range but not in the effective coverage area of said antenna, according to the approximated position of the transponder and the positions and orientations of the antennae
  redirecting the focus of the selected antenna so that the transponder is in the effective coverage area of said antenna, according to the approximated position of the transponder
  performing time-of-arrival or time-difference-of-arrival measurements with respect to the transponder, by the set of antennae (Continued)

calculating the effective position of the transponder by using said timing measurements.

8 Claims, 2 Drawing Sheets

(51) Int. Cl.
*G01S 5/02* (2010.01)
*G01S 13/75* (2006.01)
*G01S 13/87* (2006.01)

(52) U.S. Cl.
CPC ............... *G01S 5/06* (2013.01); *G01S 13/75* (2013.01); *G01S 13/878* (2013.01)

(56) References Cited

U.S. PATENT DOCUMENTS

| | | |
|---|---|---|
| 6,270,433 B1 | 8/2001 | Orenstein et al. |
| 2005/0035897 A1* | 2/2005 | Perl ........................... G01S 5/12 342/29 |
| 2006/0170565 A1* | 8/2006 | Husak .................. G06K 7/0008 340/8.1 |
| 2010/0001896 A1* | 1/2010 | Fiereizen .................. G01S 3/48 342/42 |

\* cited by examiner

METHOD FOR CALCULATING A POSITION OF A TRANSPONDER WITHIN AN AREA OF INTEREST

This application claims priority from European Patent Application No. 17175720.6 filed on Jun. 13, 2017; the entire disclosure of which is incorporated herein by reference

FIELD OF THE INVENTION

The invention relates to the field of local positioning systems having directive antennae. In particular, the invention relates to a method for calculating a position of a transponder within an area of interest by means of such a local positioning system.

BACKGROUND OF THE INVENTION

In recent years, there has been an increasing demand for reliable and objective evaluation of sport specific data. The measurement and analysis of the trajectories of athletes is one possible approach to gain such insights. It allows the assessment of the physical performance and tactical behavior of athletes. Thus, it can yield helpful feedback for athletes, coaches and referees. Furthermore, spectators can be supplied with additional information about the accomplishments of their idols.

Local Positioning Systems (LPS) provide a means for the measurement of athletes' positions and motion trajectories. State-of-the-art systems use time-of-arrival or time-difference-of-arrival measurements of electromagnetic waves. These electromagnetic waves travel between antennae with fixed and known positions and mobile transponders (tags) with unknown and variable positions. Using the timing measurements from several antennae with respect to the mobile transponder, the position of the mobile transponder in the coordinate system of the local positioning system can be determined. When such a mobile transponder is attached to an object or person, the position of this object or person can be determined from the position of the mobile transponder.

Usually, directive antennae are preferred over omnidirectional antennae in order to extend the ranges of the radio coverage areas. Throughout this text, 'range' shall mean the maximum distance to the antenna to which the transponder may be located in order to receive electromagnetic waves from said antenna. In addition, 'coverage area' shall mean the area on which the transponder must be located to receive electromagnetic waves from said antenna. For the purposes of this text, 'the transponder is within range of the antenna' shall mean that the distance between the transponder and the antenna is short enough for the transponder to receive electromagnetic waves from said antenna. Moreover, it is understood that in addition to being within range of the antenna, the transponder needs to be on the effective coverage area of the antenna in order to receive electromagnetic waves from said antenna.

For illustrative purposes only, a radiation pattern of a typical directive antenna is given in FIGS. 1a and 1b. In particular, FIG. 1a shows the horizontal radiation pattern and FIG. 1b shows the vertical pattern. It is to be noted that radiation pattern' refers to the angular dependence of the strength of the electromagnetic waves from the antenna.

Understandably, if the mobile transponder is not within range of said antenna, or within range but not in the coverage area of a directive antenna of the LPS, no timing measurement will be available for said antenna with respect to said transponder. However, in order to allow localization of the transponder, a sufficient number of timing measurements needs to be available. In particular, to obtain a unique 2D position solution, at least three timing measurements are required, and to obtain a unique 3D position solution, at least four timing measurements are required. As a consequence, if the number of available timing measurements is not high enough, the position of the transponder cannot be determined.

Moreover, even if the number of available timing measurements is sufficient to calculate the transponder's position, it is advantageous to increase them in order to improve accuracy.

A solution for reducing the risks that a situation where the position of the transponder cannot be calculated and/or to enhance the calculation accuracy, is to increase the number of antennae in the vicinity of an area of interest on which the transponder is supposed to move. However, adding additional antennae is costly, and the number of antennae a LPS can handle is usually also limited.

SUMMARY OF THE INVENTION

It is an object of the invention to overcome these drawbacks in proposing a solution for increasing the number of available timing measurements without increasing the number of antennae of the local positioning system.

Hence, the invention relates to a method for calculating a position of a transponder within an area of interest, by means of a local positioning system comprising a set of directive antennae located in the vicinity of the area of interest, each antenna having a coverage area, the method comprising the following steps:
  assessing an approximate position of the transponder
  selecting at least one antenna of the set of antennae that is such that the transponder is within range but not in the effective coverage area of said antenna, according to the approximated position of the transponder and the positions and orientations of the antennae
  redirecting the focus of the selected antenna, so that the transponder is in the effective coverage area of said antenna, according to the approximated position of the transponder
  performing time-of-arrival or time-difference-of-arrival measurements with respect to the transponder, by the set of antennae
  calculating the effective position of the transponder by using said timing measurements.

As previously mentioned, 'the transponder is within range of the antenna' shall mean that the distance between the transponder and the antenna is short enough for the transponder to receive electromagnetic waves from said antenna. However, it is understood that in addition to being within range of the antenna, the transponder needs to be on the effective coverage area of the antenna in order to receive electromagnetic waves from said antenna—that is to say, the orientation of the antenna must be such that the transponder is located in the coverage area of the antenna. Besides that, 'performing timing measurements by the set of antennae' means that all antennae of the set shall try to provide time-of-arrival or time-difference-of-arrival measurements with respect to the transponder, but of course eventually timing measurements will only be available with respect to the antennae whose coverage areas cover the transponder. Finally, 'redirecting the focus of the antenna' shall mean changing the direction of the antenna. Changing the direction of the antenna can be achieved via a mechanical rotation but also electronically using beam-steering techniques.

The method according to the invention enables increasing the number of available timing measurements for a given position of the transponder within the area of interest by redirecting the focus of at least one antenna such that the transponder that was initially outside of its coverage area becomes in its coverage area. Thus, the calculation of the transponder position can be based on more timing measurements, which decreases the risk that not enough measurements are available, and improves the calculation accuracy.

Furthermore, the method according to the invention may comprise one or a combination of the characteristics of claims 2 to 8.

BRIEF DESCRIPTION OF THE DRAWING

Other features and advantages of the present invention will appear more clearly upon reading the following detailed description, made with reference to the annexed drawings, given by way of non-limiting example.

DETAILED DESCRIPTION OF THE PREFERRED EMBODIMENTS

Figure 1A:
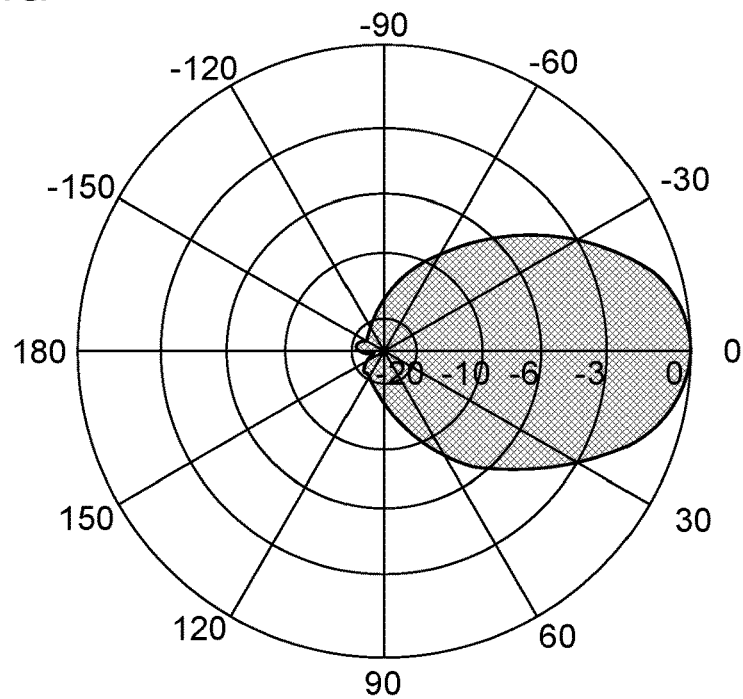
FIG. 1a shows the horizontal radiation pattern of a typical directive antenna
Figure 1B:
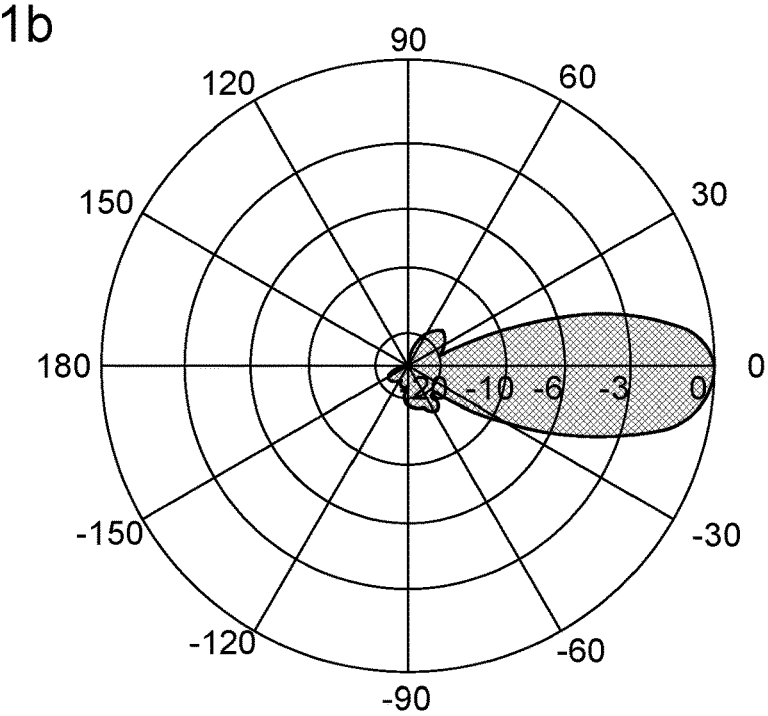
FIG. 1b shows the vertical radiation pattern of the antenna to which reference has been made in FIG. 1a FIG. 2 shows an environment comprising an area of interest on which a transponder is located, and a set of directive antennae located in the vicinity of said area of interest, in an original setup
Figure 2:
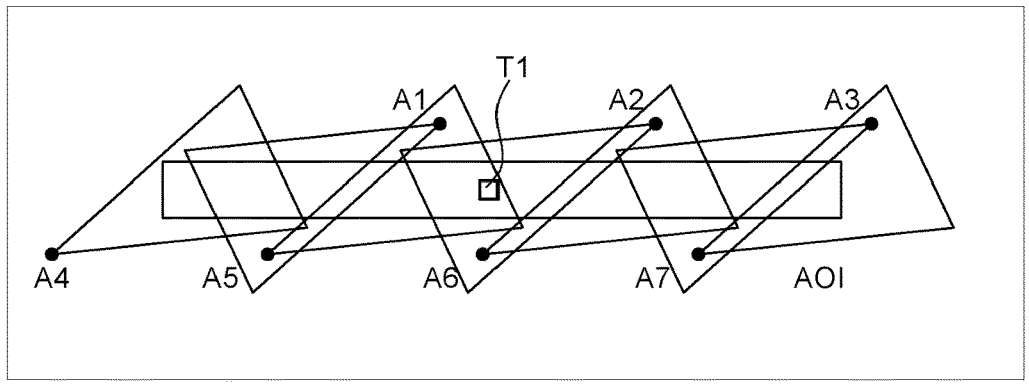
Figure 3:
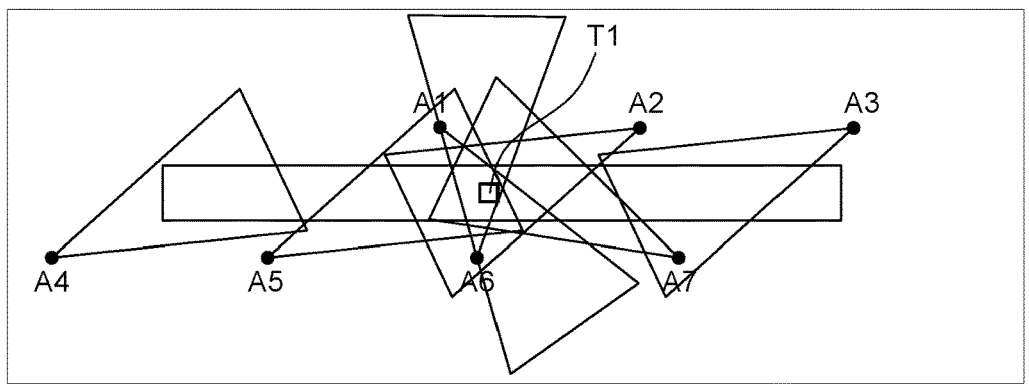
FIG. 3 shows the environment to which reference has been made in FIG. 2, in an improved setup as defined by a method according to a non-limited embodiment of the invention
Figure 4:
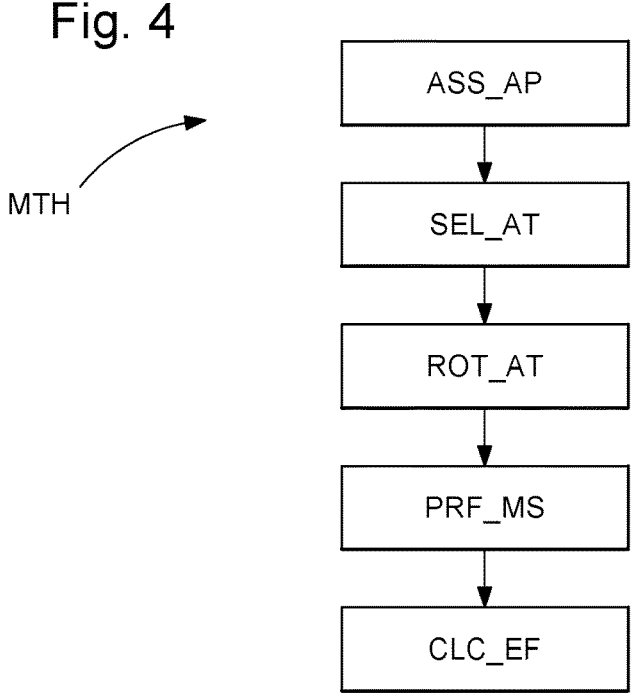
FIG. 4 shows a flow diagram illustrating the steps of the method, according to the method to which reference has been made in FIG. 3.

The method according to the invention is implemented by a local positioning system, an example of which is illustrated in FIG. 2 and FIG. 3. The system comprises a set of antennae A1-A7 located in the vicinity of an area of interest AOI. A transponder T1, advantageously attached to an athlete whose position is to be determined, is located in said area of interest AOI.

FIG. 2 shows an initial set up of the set of antennae A1-A7, that is to say the antennas orientations before the method starts (initial orientations). For illustrative purposes, the area that is covered by each antenna is approximated as a triangle. In this example, most parts of the area of interest AOI are covered by two antennae, only small parts are covered by tree antennae. As can be seen, the transponder T1 is originally in the effective coverage area of only two antennae: A2 and A5. Thus, performing time-of-arrival or time-difference-of-arrival measurements with respect to the transponder T1 by the set of antennae A1-A7 could at most provide two timing measurements. These two timing measurements would not be sufficient to enable the calculation of the transponder's position, hence the importance of the method MTH according to the invention, described below.

In a first step ASS_AP of the method MTH according to the invention, an approximate position of the transponder T1 is assessed. The assessment of the position may be performed by using at least one last measured position(s) of the transponder, a suitable motion model and a probabilistic filter, such as the Kalman Filter. Kalman filtering is an algorithm that uses a series of measurements observed over time, containing statistical noise and other inaccuracies, and produces estimates of unknown variables that tend to be more precise than those based on a single measurement alone.

Another way of assessing the approximate position of the transponder T1 includes using at least one last measured position(s) of the transponder and inertial measurements to estimate the displacement of the transponder.

Another way of assessing the approximate position of the transponder T1 includes assuming that the transponder is static, that is to say that the approximate position is the same as a last measured position. This assumption may be justified if the sampling rate of the system is high enough, which implies the timespan for the prediction is small enough.

Another way of assessing the approximate position of the transponder T1 includes performing time-of-arrival or time-difference-of-arrival measurements with respect to the transponder, by the set of antennae A1-A7 in their initial orientations. If enough measurements are available, that is to say:

if at least three timing measurements are available in a case where a 2D position needs to be calculated, that is to say if the transponder T1 is at least in three coverage areas when the antennae have their initial orientations, or if at least four timing measurements are available in a case where a 3D position needs to be calculated, that is to say if the transponder is at least in four coverage areas when the antennae have their initial orientations, then an approximate position of the transponder T1 is calculated by using these available timing measurements. Otherwise, the area of interest AOI is scanned by turning the antennae A1-A7 into different directions until a setting is found that provides sufficient timing measurements for locating the transponder T1.

Alternatively, the approximate position may be manually provided by an operator.

In a second step SEL_AT of the method MTH according to the invention, at least one antenna of the set of antennae A1-A7 is selected. The selection criterion is the following: the transponder T1 must be within range but not in the effective coverage area of said antenna(e), according to the approximated position of the transponder and the positions and orientations of the antennae. In the example given in FIG. 2, antennae A1, A6 and A7 meet this criterion. As a consequence, one or several of these antennae shall be selected. Advantageously, all the antennae that meet the criterion are selected.

In a third step ROT_AT of the method MTH according to the invention, the focus of the selected antennae A1, A6, A7 are redirected in such a way that their coverage areas cover the transponder, as shown by way of example in FIG. 3. Advantageously, not only the focus of antennae A1, A6, A7 are redirected so that the transponder T1 is in their coverage area, but their final orientation is such that the antennae A1, A6, A7 point in the direction of the transponder T1, which is to say their main lobes are oriented towards the transponder T1.

In another embodiment, all the antennae A1-A7, irrespective of whether they were selected or not, have their focus redirected in such a way that they point towards the transponder T1. This embodiment is easier to implement, as the selection step could be avoided.

By redirecting the focus of the antennae to focus them on the transponder, the coverage of the area of interest can be improved. In the final setup illustrated in FIG. 3, the transponder T1 is covered by five antennae A1, A2, A5, A6, A7, whereas it was only covered by two antennae A2, A5 in the initial setup.

In a fourth step PRF_MS of the method MTH according to the invention, timing measurements (time-of-arrival or time-difference-of-arrival measurements) with respect to the transponder T1 are performed, by the set of antennae A1-A7 in their final orientations. Understandably, the number of available measurements generated with the antennae A1-A7 in their final orientation is higher than the number of available measurements generated with the antennae A1-A7 in their initial orientation.

In a fifth step CLC_EF of the method MTH according to the invention, an accurate effective position of the transponder T1 is calculated, using said timing measurements.

It is understood that the method allows enhancing accuracy of the transponder localization without increasing the number of antennae. The orientation of the antennae may be continuously adjusted in order to follow the mobile transponder within the area of interest.

This approach may also be used if multiple transponders need to be tracked. In many sports applications (running, horse racing, etc.), the transponders move in a group, that is to say in the vicinity of each other. By aligning the antennae in order to cover such a group of transponders optimally, the localization of multiple transponders can be improved. In such a case, the antennae could follow the average position of the transponders which would allow tracking all the transponders at the same time (if transponders are not spread out too far).

Besides that, if multiple transponders are to be tracked, the orientation of the antennae could alternate between the transponders. If the focus of the antennae is changed mechanically, this alternation may not be fast enough to allow sufficient tracking of the transponders. The focus of the antennae may alternatively be changed electronically using beam steering techniques. With such electronic beam steering, the directional characteristics of each antenna can be changed within split-seconds. This would allow focusing on different tags in turn at high rates.

Of course, the present invention is not limited to the illustrated example but may be subject to various variants and alterations, which will be apparent to those skilled in the art.

What is claimed is:

1. A method for calculating a position of a transponder within an area of interest, based on a local positioning system including a set of directive antennae located in the area of interest, each of the set of directive antennae having an effective coverage area, the method comprising:
   assessing a position of the transponder;
   selecting at least one antenna of the set of directive antennae based on the position of the transponder and positions and orientations of the set of directive antennae, the transponder not being in the effective coverage area of the selected antenna;
   locating the transponder in the effective coverage area of the selected antenna by redirecting a focus of the selected antenna based on the position of the transponder;
   performing timing measurements with respect to the transponder by the set of directive antennae, the timing measurements including time-of-arrival or time-difference-of-arrival measurements; and
   calculating an effective position of the transponder based on the timing measurements.

2. The method according to claim 1, wherein the selected antenna is configured to point a direction of the transponder by redirecting the focus of the selected antenna based on the position of said transponder.

3. The method according to claim 1, after the redirecting of the focus of the selected antenna and before the performing of the timing measurements, the method further comprising:
   selecting all antennae of the set of directive antennae based on the position of the transponder and the positions and orientations of the set of directive antennae, the transponder not being in the effective coverage area of the selected all antennae; and
   locating the transponder in the effective coverage area of the selected all antennae by redirecting the focus of said selected all antennae.

4. The method according to claim 3, wherein the selected all antennae are configured to point a direction of the transponder by redirecting the focus of the selected all antennae based on the position of said transponder.

5. The method according to claim 1, after the redirecting of the focus of the selected antenna and before the performing of the timing measurements, the method further comprising:
   redirecting the focus of all antennae of the set of directive antennae based on the position of the transponder, the selected all antennae being configured to point a direction of the transponder.

6. The method according to claim 1, wherein the assessing includes
   performing the timing measurements with respect to the transponder by the set of directive antennae,
   redirecting the focus of at least one antenna of the set of antennae,
   repeating the performing of the assessing and the redirecting of the assessing, and
   calculating the position of the transponder when a number of the timing measurements is equal to or greater than a predetermined value.

7. The method according to claim 1, wherein the assessing is based on a motion model and a previous position of the transponder in the area of interest.

8. The method according to claim 1, wherein the assessing includes manually providing a position by an operator.

* * * * *